W. D. CARPENTER & J. A. HUMPHREY.
RAILROAD TIE, CHAIR, AND FISH PLATES.
APPLICATION FILED JUNE 12, 1911.
1,021,658.
Patented Mar. 26, 1912.
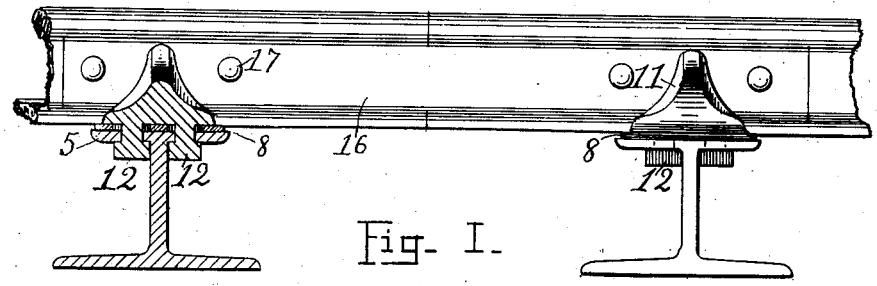
Fig- I-
Fig- II-
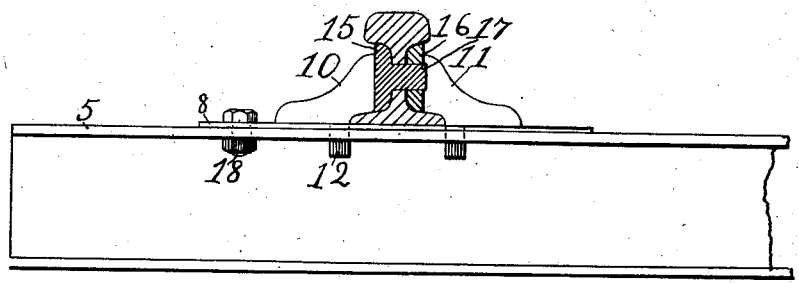
Fig- III-
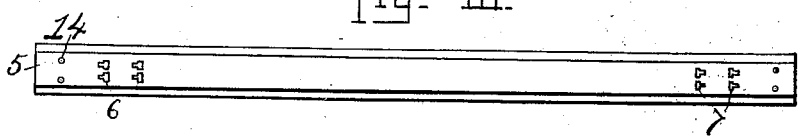
Fig- IV-
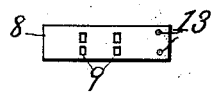
Witnesses
N. S. Waller.
D. E. Waller.
Inventors
William D. Carpenter
James A. Humphrey
By W. X. Stevens.
Attorney
COLUMBIA PLANOGRAPH CO., WASHINGTON, D. C.

UNITED STATES PATENT OFFICE.

WILLIAM D. CARPENTER AND JAMES A. HUMPHREY, OF LIMA, OHIO.

RAILROAD TIE, CHAIR, AND FISH-PLATES.

1,021,658. Specification of Letters Patent. Patented Mar. 26, 1912.

Application filed June 12, 1911. Serial No. 632,697.

*To all whom it may concern:*

Be it known that we, WILLIAM D. CARPENTER and JAMES A. HUMPHREY, citizens of the United States, residing at Lima, in the county of Allen and State of Ohio, have invented certain new and useful Improvements in Railroad Ties, Chairs, and Fish-Plates, of which the following is a specification.

This invention relates in general to means for securing railroad rails together at their joints, and for securing the rails to the ties; and more particularly to an improvement on the invention shown in our former Letters Patent No. 934,040 whereby the principle of automatic locking of the parts together is extended to fish plates in combination with the chairs and ties of the said former invention.

To this end our invention consists in the construction and combination of parts forming a combined railroad tie, pillow block and fish plate hereinafter more fully described, and particularly stated in the claim, reference being had to the accompanying drawing, in which:

Figure I represents in side elevation a portion of two rails, a pair of fish plates and adjacent parts, partly in vertical section, according to our invention. Fig. II shows a rail and a pair of fish plates in transverse vertical section with adjacent parts in side elevation. Fig. III is a top view of a tie, and Fig. IV is a top view of a locking plate.

The tie may be either an I beam of metal, or it may be a mere top plate mounted on a wooden tie; but in either case this top plate, as represented by the tie head 5, has T-shaped holes in pairs 6, 6 and 7, 7 vertically through it. A locking plate 8 has holes 9, 9 in pairs through it shaped like the head portion of the said T-shaped holes and adapted to register therewith.

Thus far we have described only details of our former Patent No. 934040. Now we provide fish plates 15, 16, in pairs, one plate 15, having studs 17, to pass through holes in the rails, and the other plate, 16, having holes to register with and receive the ends of the said studs which project beyond the rail. We further provide each fish plate with one or more pillow blocks 10, 11, the block 10, integral with or secured to the fish plate 15, and the blocks 11, being integral with or secured to the fish plate 16. From each pillow block one or more lugs 12, having T-shaped heads, depend to pass through the holes 9, in plate 8, and into the holes 6, in the top plate of the tie. Then the rail, the fish plates, their pillow blocks and the plate 8, are to be slid outward upon the tie until the lugs come to the smaller ends of the holes 6, and the T-heads of the lugs hold firmly under the top flange of the tie. Rails are usually provided with bolt holes for attaching fish plates, and these studs may be located to register with those holes. The studs 17 may be formed by casting or forging as parts of the plate 15, or they may be screwed, riveted or otherwise permanently fixed thereto, and, however formed when ready for service, they are practically integral with the plate. By this method of securing rails together and to the ties there are no bolts and nuts to be applied in setting up new work or in repairs, or to be worked loose by the jars in service. The bolts 18, passing through the holes 13, 14 are merely pins as a safeguard against backward slipping of the plate 8, and they have little, if any, service to perform, because the strain upon the rails is always outward, pushing the lugs 12 into their sockets and never out of them. In this invention, as in our former patent referred to, we locate the T-shaped holes 6 and 7 at the exact distance apart to properly locate the rails without requiring a trial gage, thus saving the time of adjusting the width between rails and also guarding against the spreading of rails in service. By this invention the rails are automatically secured together and to the ties. Putting the fish plates and their attached pillow blocks in place automatically secures the rails at gage.

Having thus fully described our invention, we claim—

A pair of fish plates one of which is provided with projecting studs to pass through a rail and the other having holes to receive the studs; a pillow block integral with each fish-plate; a T-shaped lug integral with and depending from the said pillow block, and a railroad tie provided with a top plate having T-shaped holes to receive the said lugs, whereby connecting bolts are dispensed with.

In testimony whereof we affix our signatures in presence of two witnesses.

WILLIAM D. CARPENTER.
JAMES A. HUMPHREY.

Witnesses:
EMMET T. LANDES,
MARGARET McGRAW.

Copies of this patent may be obtained for five cents each, by addressing the "Commissioner of Patents, Washington, D. C."